(12) United States Patent
Gakhar et al.

(10) Patent No.: US 9,594,387 B2
(45) Date of Patent: Mar. 14, 2017

(54) VOLTAGE REGULATOR STABILIZATION FOR OPERATION WITH A WIDE RANGE OF OUTPUT CAPACITANCES

(75) Inventors: Vikram Gakhar, Bangalore (IN); Preetam Charan Anand Tadeparthy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 858 days.

(21) Appl. No.: 13/235,529

(22) Filed: Sep. 19, 2011

(65) Prior Publication Data

US 2013/0069608 A1 Mar. 21, 2013

(51) Int. Cl.
*G05F 1/10* (2006.01)
*G05F 1/575* (2006.01)
*H02M 1/36* (2007.01)
*G05F 1/46* (2006.01)

(52) U.S. Cl.
CPC ............ *G05F 1/575* (2013.01); *G05F 1/468* (2013.01); *H02M 1/36* (2013.01)

(58) Field of Classification Search
CPC ... G05F 1/10; G05F 1/46; G05F 1/461; G05F 1/468; G05F 1/56; G05F 1/565; G05F 1/575; H02M 1/36
USPC ................................. 323/273–281
See application file for complete search history.

(56) References Cited

U.S. PATENT DOCUMENTS

| | | | |
|---|---|---|---|
| 5,381,082 A | 1/1995 | Schlicht | |
| 6,147,478 A * | 11/2000 | Skelton et al. | 323/288 |
| 6,661,211 B1 | 12/2003 | Currelly et al. | |
| 7,199,565 B1 | 4/2007 | Demolli | |
| 7,679,437 B2 | 3/2010 | Tadeparthy et al. | |
| 7,714,553 B2 | 5/2010 | Lou | |
| 7,719,243 B1 | 5/2010 | Balogh | |
| 7,940,124 B2 | 5/2011 | Kolakovic et al. | |
| 8,049,551 B2 | 11/2011 | Kotowski et al. | |
| 8,242,760 B2 * | 8/2012 | Takagi et al. | 323/276 |
| 2004/0021450 A1 * | 2/2004 | Wrathall | 323/282 |
| 2009/0284235 A1 * | 11/2009 | Weng et al. | 323/222 |
| 2010/0262029 A1 * | 10/2010 | Kelly et al. | 600/518 |

OTHER PUBLICATIONS

U.S. Appl. No. 12/649,035, filed Dec. 29, 2009.

* cited by examiner

*Primary Examiner* — Jessica Han
(74) *Attorney, Agent, or Firm* — William B. Kempler; Charles A. Brill; Frank D. Cimino (57) ABSTRACT

A voltage regulator includes a measurement circuit for obtaining a value representing a magnitude of an output capacitance connected at an output node of the voltage regulator. A correction circuit in the voltage regulator modifies a compensation circuit internal to the voltage regulator based on the value. The modification of the compensation circuit is done to ensure that sufficient stability margins to accommodate the output capacitance are ensured for the main feedback loop in the voltage regulator. In an embodiment, a voltage proportional to the output capacitance is detected at start-up of the voltage regulator, and a corresponding binary signal is generated. The logic value of the binary signal is used to add or remove components and/or circuit portions in the compensation circuit to ensure stability. The voltage regulator is thus designed to support a wide range of output capacitance values.

17 Claims, 5 Drawing Sheets

VOLTAGE REGULATOR STABILIZATION FOR OPERATION WITH A WIDE RANGE OF OUTPUT CAPACITANCES

BACKGROUND

Technical Field

Embodiments of the present disclosure relate generally to voltage regulators, and more specifically to techniques for stabilizing a voltage regulator for operation with a wide range of output capacitances.

Related Art

A voltage regulator receives an unregulated voltage as input and provides a regulated voltage as output. For improving regulation, an output capacitor (not included in the voltage regulator) is usually connected at the output node at which the voltage regulator generates the regulated output voltage. The specific value of the output capacitor may be different based on the requirements of the application environment. For example, if better regulation is required, the output capacitor may be chosen to have a larger capacitance value, and vice-versa. Thus, a voltage regulator may need to be designed to operate for a wide range of output capacitance values.

As is well known in the relevant arts, a voltage regulator employs closed-loop feedback, and stability of the closed-loop (or simply of the voltage regulator) is typically required to be ensured. The capacitance of the output capacitor forms a pole in the transfer function of the closed-loop, and the specific value of the output capacitance generally affects the stability of the closed-loop.

Compensation circuits are generally implemented within a voltage regulator to make the closed-loop stable. Stability of the closed-loop depends on the positions of all the poles and zeros in the closed-loop. The wide range of possible output capacitance values generally complicates the design of the compensation circuits within the voltage regulator, and may require trade-offs in the design of the voltage regulator. For example, one possible technique to ensure stability is to design the voltage regulator to have a dominant internal pole (lowest-frequency pole in the loop due to circuits or components implemented within the voltage regulator), thereby minimizing the effect of the pole due to the output capacitance on the loop stability. However, such an approach may reduce the bandwidth of the voltage regulator, thereby resulting in poor transient performance, and hence may not be desirable at least for such reason.

Hence, it is generally desirable to design a voltage regulator such that loop-stability is ensured for a wide range of possible output capacitance values.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A voltage regulator includes a measurement circuit and a correction circuit. The measurement circuit is designed to generate a value representing a magnitude of an output capacitance connected at an output node of the voltage regulator. The correction circuit is designed to modify, based on the value generated by the measurement circuit, a compensation circuit internal to the voltage regulator.

Several embodiments of the present disclosure are described below with reference to examples for illustration.

It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Voltage Regulator

Figure 1:
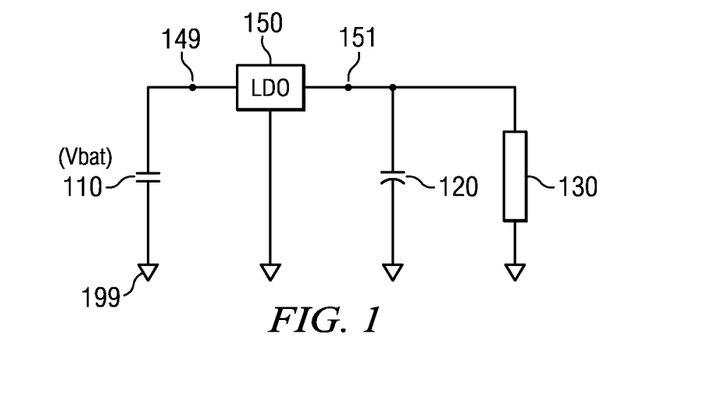
FIG. 1 is a diagram of an example component in which several embodiments can be implemented.

FIG. 1 is a diagram of an example component in which several embodiments can be implemented. FIG. 1 is shown containing low-dropout regulator (LDO) 150, battery 110, capacitor 120, and load 130. LDO 150, which is a linear regulator, receives the unregulated power supply voltage (Vbat) from battery 110 on input node 149, and provides a regulated output voltage on output node 151. Capacitor 120 is an output capacitor used for providing improved regulation, and has a value that may be application-specific. For example, the nature of load 130 and/or the level of regulation required may determine the value of the capacitance of capacitor 120. Thus, depending on the specific application requirements, the possible range for the selected value of capacitance 120 that LDO 150 may need to operate with may be wide. Terminal 199 represents a ground terminal. While the description below is provide with respect to linear voltage regulators, the techniques described herein can be applied in switching regulators as well.

Figure 2:
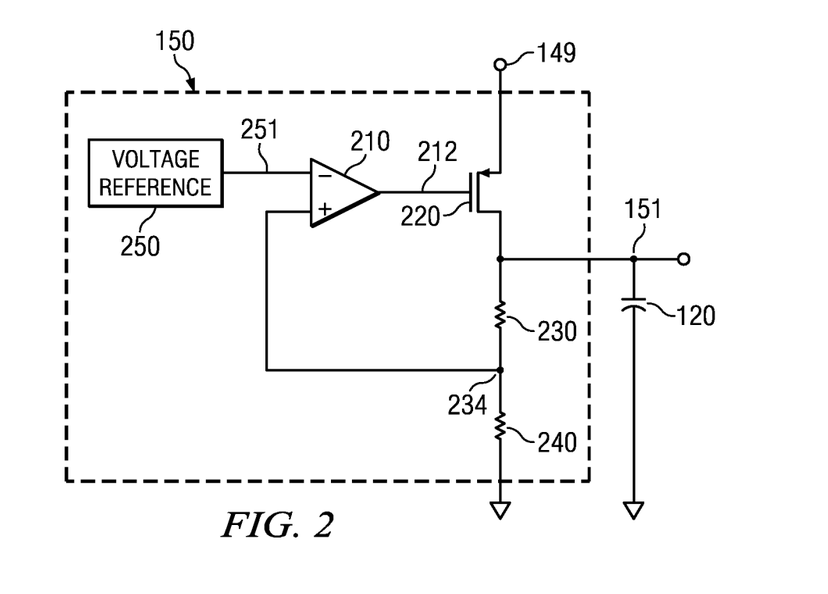
FIG. 2 is a diagram showing partial internal details of a low-dropout regulator (LDO).

FIG. 2 shows partial internal details of LDO 150. The details are shown merely to illustrate the effect of output capacitance on loop stability, and the actual implementation may be different and/or contain more circuits and corresponding interconnections. Output capacitor 120 is also shown in FIG. 2. Output 212 of amplifier 210 controls the resistance of pass transistor 220 to maintain node 151 at a desired constant voltage (regulated voltage). Resistor 230 (first resistor) and 240 (second resistor) implement a voltage divider network, and the voltage at node 234 is fed back to the non-inverting input (+) of amplifier 210, which is shown implemented as an operational amplifier (OPAMP). Amplifier 210 receives, on its inverting (−) terminal, a reference voltage from voltage reference 250 on path 251. Voltage reference 250 may be implemented, for example, as a band-gap reference. Amplifier 210 generates an output voltage on path 212 (connected to the gate terminal of pass transistor 220) so as to maintain the voltage at node 251 equal to the voltage at node 234. The connection of node 234 back to amplifier 210 implements a closed-loop feedback for regulating output voltage 151. This closed-loop is referred to herein as the main feedback loop in LDO 150 to distinguish this loop from other feedback loops, such as a Miller feedback loop (which may be used to provide compensation), that may also be contained within LDO 150.

As noted above, the presence of capacitor 120 creates a pole in the transfer function of the main feedback loop. Different capacitance values of capacitor 120 translate to different pole locations due to the output capacitor, which in turn may render design of compensation schemes for loop stability of the main feedback loop complicated.

In embodiments of the present disclosure, the value of the output capacitance is measured, or some parameter representing (or proportional to) the output capacitance is determined. Depending on the value thus measured, one or more parameters of a compensation circuit implemented within LDO 150 is/are adjusted, or the compensation circuit is somehow modified such that loop stability of the main feedback loop is ensured. Such measurement and adjustment/modification is performed automatically by corresponding circuits implemented within LDO 150, as described with examples below.

2. Measuring Output Capacitance

In an embodiment, LDO 150 is implemented with circuitry to cause output voltage 151 to ramp-up (increase from zero to some desired value) with a constant slope upon power-ON of LDO 150, a brief description of which is provided below. However, for further details, the reader is referred to U.S. patent application Ser. No. 12/649,035, titled "STARTUP CIRCUIT FOR AN LDO", filed on 29 Dec., 2009, which is incorporated by reference in its entirety herewith.

Figure 3:
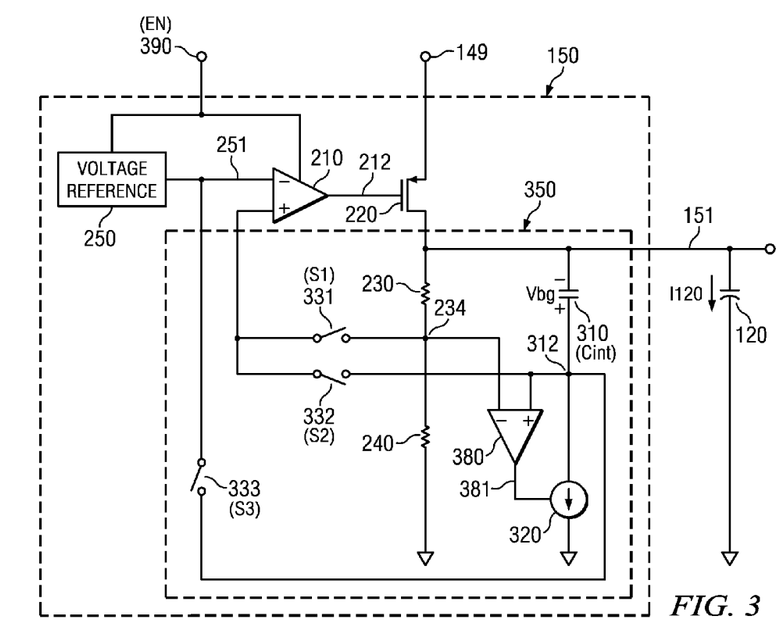
FIG. 3 is a diagram illustrating the details of a start-up circuit used in a LDO, in an embodiment.

FIG. 3 is a diagram showing output capacitor 120 and partial internal details of LDO 150. In addition to amplifier 210, pass-transistor 220, resistor 230 and 240, and voltage reference 250, LDO 150 is also shown containing switches 331 (S1), 332 (S2) and 333 (S3), capacitor 310 (Cint), current source 320 and comparator 380. Each of switches S1, S2 and S3 may be implemented using transistors, with corresponding control signals for opening and closing the corresponding switches being generated by suitable logic, not shown.

The non-inverting (+) terminal of amplifier 210 is connectable to node 234 via switch 331(S1). Node 312 is connectable to voltage 251 via switch S3. The non-inverting (+) terminal of amplifier 210 is connectable to voltage 251 via switches S2 and S3. Block 350 is referred to herein as a start-up circuit.

Immediately on power-ON of LDO 150 (for example, on connecting battery 110 to LDO 150, or when amplifier 210 and voltage reference 250 are enabled for operation via signal EN (390), switches S3 and S2 are closed. Both the inverting and non-inverting terminals of amplifier 210 are at the same voltage (equal to the voltage at node 251, also referred herein as Vbg). The voltage at output node 151 is 0 volts (V) since LDO 150 is in a disabled state prior to power-ON or enabling (output voltage 151 is typically discharged to ground (0V) through internal or parasitic paths when LDO 150 is disabled). Capacitor Cint charges to a voltage equal to that at node 251, with the polarity of the voltage (Vbg) across Cint being as shown in FIG. 3.

Figure 4:
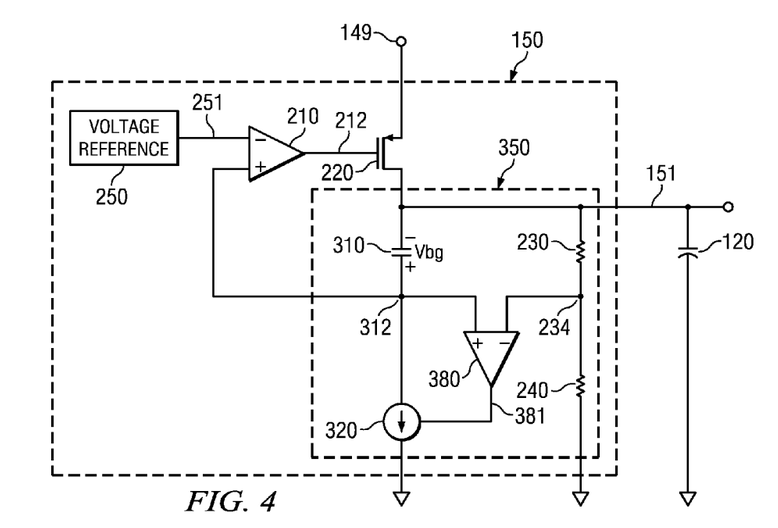
FIG. 4 is a diagram of the equivalent circuit of FIG. 3 during start-up of the LDO.

Switch S3 is subsequently opened, with switch S1 remaining open and switch S2 remaining closed. With these conditions, the circuit of FIG. 3 reduces to the equivalent circuit of FIG. 4. Capacitor 310 starts discharging the stored charge. Current source 320 causes capacitor 310 to discharge with a constant current. Assuming the constant current value through current source 320 is 'I320', the rate of change of voltage (dv/dt) at node 151 is expressed by the following equation:

$$dv/dt = C310/I320 \qquad \text{Equation 1}$$

wherein,

C310 is the capacitance of capacitor 310.

From equation 1, it may be observed that the value of dv/dt is a constant, i.e., the output voltage at node 151 changes at a constant rate. Start-up circuit 350 therefore enables output voltage 151 to ramp-up at a constant rate.

Ramp-rate (dv/dt) is also independent of the output capacitor 120. Since the ramp-rate (dv/dt) of the output voltage (at node 151) is a constant that is set by design internally in LDO 150, the current through output capacitor 120 can be used as an indicator of the magnitude of output capacitance.

A rate of change of voltage of dv/dt at node 151 results in a current I120 through output capacitor 120 as given by the following equation:

$$I120 = C120/[dv/dt] \qquad \text{Equation 2}$$

wherein,

C120 is the capacitance of capacitor 120, and dv/dt is as specified in equation 1, and I120 is the current through output capacitor 120.

It may be appreciated that, dv/dt being a constant, I120 varies only with C120, and may therefore be used as an indicator of the magnitude of C120. Current I120 also equals the current through pass transistor 220.

Once output voltage 151 reaches a desired nominal value, current source 320 is switched-off. The switching-off of current source 320 is effected by signal 381 generated by comparator 380. When the voltage at node 234 becomes greater than the voltage at node 312, comparator 380 switches-off current source 320, and LDO 150 then operates normally to generate a regulated voltage at node 151. The interval between the time instances at which LDO is enabled for operation (or from the instant of application of Vbat 110) and the switching-off of current source 320 is referred to herein as a 'start-up interval', and the current flowing through LDO 150 (i.e., current between nodes 149 and 151 shown in FIG. 1, also equal to I120 of Equation 2) is referred to as the 'start-up current'.

Figure 5:
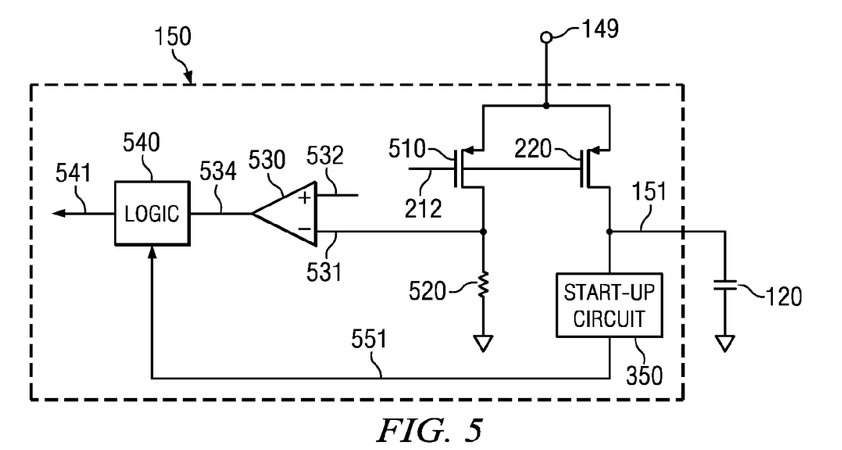
FIG. 5 is a diagram illustrating the manner in which a measure representing output capacitance of a LDO is determined, in an embodiment.

FIG. 5 is another diagram showing partial internal details of LDO 150, and illustrating the manner in which a measure representing output capacitance (i.e., of capacitor 120) is determined. In addition to pass transistor 220, start-up circuit 350 and output capacitor 120, comparator 530, transistor 510, resistor 520 and logic 540 are also shown contained in LDO 150.

The gate terminal of mirror transistor 510 is also connected to node 212 (output of amplifier 210 of FIG. 4). Hence, transistors 510 and 220 form a current-mirror pair. The dimensions (channel width, etc) of transistor 510 may be sized to be equal or some other ratio of the dimensions of transistor 220. The current through transistor 510, and therefore the current through resistor 520 is either equal to or a known fraction of I120 (the current that flows through pass transistor 220 during start-up). Thus the voltage drop across resistor 520, i.e., the voltage at node 531, is indicative of and proportional to C120.

Comparator 530 receives the voltage across resistor 520 on its inverting node (531) and a reference voltage on its non-inverting terminal (532), and generates binary output 534 representing the result of the comparison. Logic 540 forwards binary output 534 on path 541 if signal 551 from start-up circuit 350 indicates that the start-up phase is complete and that LDO 150 is operating in normal mode to generate a regulated output voltage 151. Signal 551 may be the same as signal 381 (FIG. 4), or may be generated in some other known way. A compensation circuit implemented within LDO 150 may be adjusted or modified based on the value of binary signal 541, as illustrated with examples below. While a simple binary (two-level) comparison is shown in FIG. 5, in other embodiments voltage 531 may be compared with multiple ranges of voltages, using multiple comparators to generate corresponding multiple outputs. Thus, multiple 'levels' of adjustments or modifications of the compensation circuit (corresponding to multiple ranges of output capacitance) are also possible. The circuit formed by transistor 510, resistor 520, and comparator 530 may be viewed as a "measurement circuit" operating to generate a value (logic level of binary signal 534) representing output capacitance 120.

Figure 6:
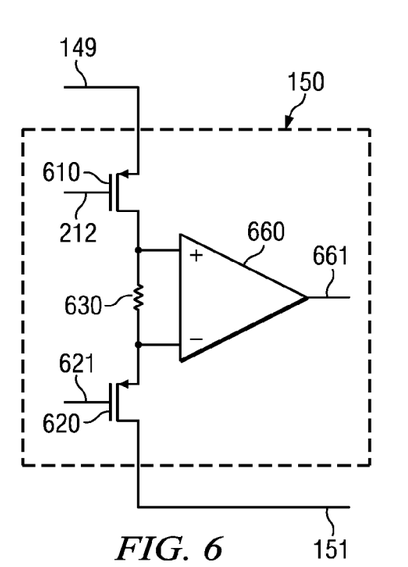
FIG. 6 is a diagram illustrating the details of a circuit used for obtaining a measure representing the magnitude of output capacitance of a LDO, in another embodiment.

FIG. 6 is a diagram illustrating the details of a circuit used for obtaining a measure representing the magnitude of output capacitance in another embodiment of LDO 150. Transistor 610 is a mirror of pass transistor 220 (not shown in FIG. 6), and shares the same source and gate connections as pass transistor 220. Hence, the current flowing through transistor 610 is a fixed fraction of the output current flowing through pass transistor 220, and flows through resistor 630 and transistor 620. Transistors 620 and 630 form a cascoded pair. The gate of transistor 620 receives a reference voltage on path 621. The voltage across resistor 630 is sensed by comparator 660, whose output 661 may be provided as input to inverting terminal (−) of comparator 530 shown in FIG. 5, with output 534 of comparator 530 disconnected from logic 540. Comparator 530 and logic 540 of FIG. 5 process their respective inputs as described above with respect to FIG. 5, and generate signal 541. Alternatively, multiple outputs, each indicating a corresponding value or range of values of output capacitor 120 may also be generated, as would be apparent to one skilled in the relevant arts, and also noted above. Similar to the measurement circuit noted above with respect to FIG. 5, transistors 610 and 620, resistor 630 and comparator 660 of FIG. 6 in combination with comparator 530 of FIG. 5 may also be viewed as a "measurement circuit".

The logic level of signal 534 indicates whether the load current, and hence the output capacitance, is above or below a certain threshold, and is thus representative of the value of the output capacitance. A desired value of the threshold may be determined a priori based on stability analysis of the main feedback loop of LDO 150 for various values of output capacitances, and the value of the reference voltage on path 532 may be set accordingly. Output 541 is used to adjust or modify the compensation circuit appropriately, as described next.

3. Modifying the Compensation Circuit

Figure 7:
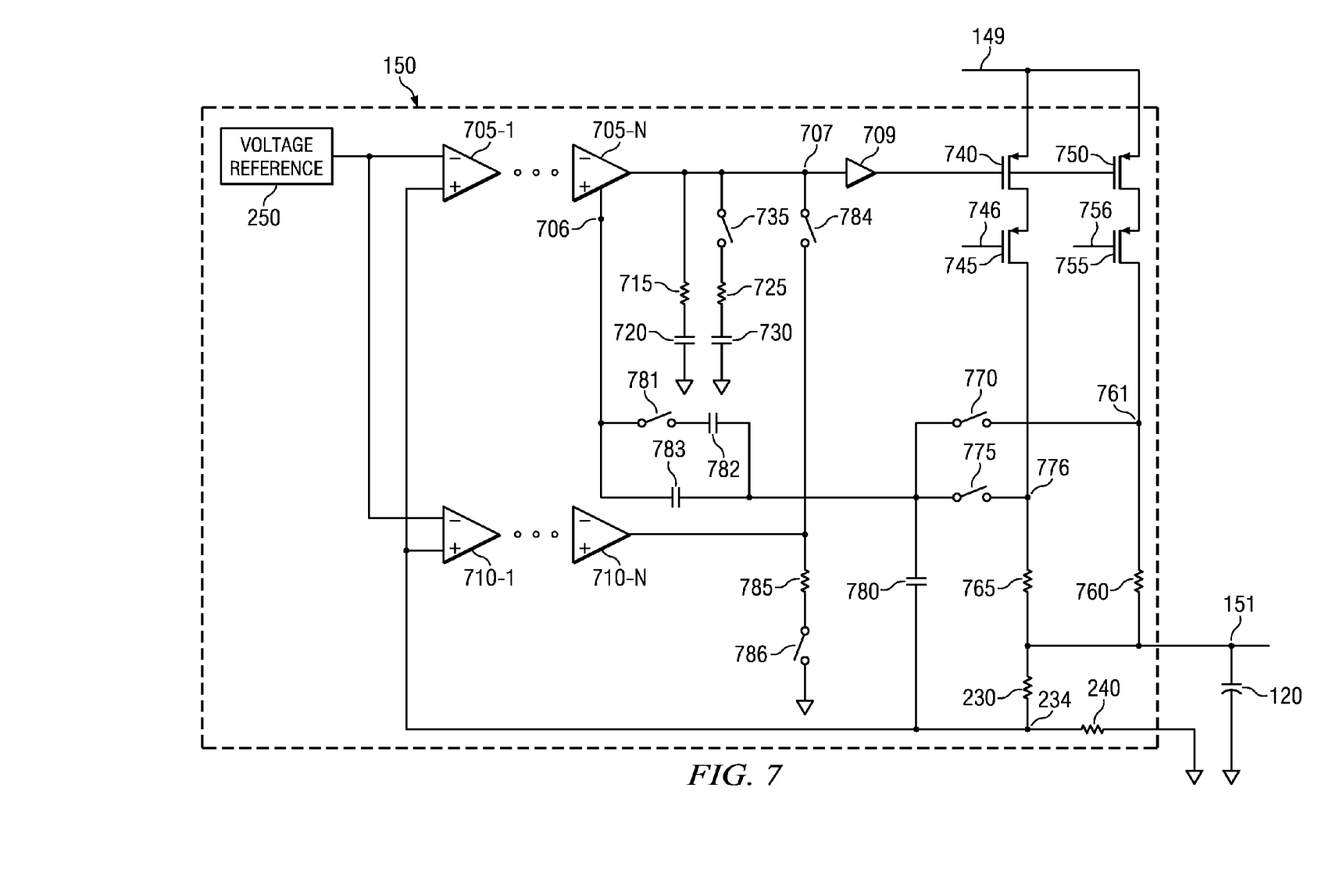
FIG. 7 is a block diagram of partial internal details of a LDO in an embodiment, used to illustrate the manner in which a compensation circuit implemented within the LDO is modified.

FIG. 7 is a block diagram of partial internal details of LDO 150, in an embodiment. Amplifiers 705-1 through 705-N represent cascaded amplifier stages. Similarly, amplifiers 710-1 through 710-N represent cascaded amplifier stages. The output of amplifier 705-N (first amplifier) is connected to the input of gate driver stage 709. Blocks 705-1 to 705-N, 710-1 to 710-N together with gate driver stage 709 represent amplifier 210 of FIG. 2. The voltage on node 707 is a "correction voltage" generated based on the difference between the voltage at node 234 and the output voltage of voltage reference 250.

Amplifier 710-N is selectively connectable to the input of gate driver stage 709, as described below. Transistor 740 is a pass-transistor whose resistance is controlled to generate a regulated voltage at output 151. Transistor 745 together with pass-transistor 740 forms a cascoded pair, and the cascoded pair is equivalent in function to pass-transistor 220 of FIG. 4. Transistors 750 (mirror-transistor) and 755 form a cascoded pair, and are a mirror of the pair formed by transistors 740 and 745. The circuits of FIGS. 3 and 5 (or alternatively FIGS. 3 and 6), and the corresponding interconnections, are not shown in FIG. 7, but are assumed to be included in LDO 150 shown in FIG. 7.

The tap from node 234 to the non-inverting (+) input of amplifier 705-1 (as well as 710-1) represents the feedback path of the main feedback loop that operates to regulate output voltage 151. The path from node 776 (or 761 depending on which of switches 770 and 775 is closed) via capacitor 783 to node 706 (feedback terminal) of amplifier 705-N represents a feedback path for Miller loop compensation.

The value of capacitance in the feedback path for Miller loop compensation (Miller compensation loop or Miller feedback loop) is termed Miller capacitance, and equals either the capacitance of capacitor 783 (first Miller capacitor) alone, or the sum of capacitances of capacitors 783 and 782 (second Miller capacitor), depending on whether switch 781 is closed or not. The RC circuit formed by the series connection of resistor 715 and capacitor 720 is used to generate a pole (internal pole) in the main feedback loop of LDO 150. The internal pole thus generated assists in ensuring stability of the feedback-loop. An additional RC circuit formed by the series connection of resistor 725 and capacitor 730 may be connected by closing switch 735, as described below.

Components 715, 720, 735, 725, 730, 781, 782, 783, 784, 785, 786, 780, 770, 775, 765, and 760 are used to provide compensation for stabilizing LDO 150, and are referred to herein as a compensation circuit. The compensation circuit is implemented within LDO 150.

In an embodiment, if capacitance (C120) of output capacitor 120 is higher than a threshold as indicated by signal 541, switch 775 is closed and switch 770 (second switch) is opened. However, if capacitance of output capacitor 120 is less than the threshold (as indicated by signal 541), switch 770 is closed and switch 775 is opened. With switch 775 (first switch) closed, the tap point of the Miller feedback loop (via capacitor 783) is at node 776 (first junction node). Resistance R765 (fifth resistance) of resistor 765 represents the sum of parasitic resistance (of bond wire from internal pad to integrated circuit (IC) pin representing terminal 151) and equivalent series resistance (ESR) of capacitor 120. Resistance 765 in combination with C120 form a zero in the closed-loop transfer function of the main feedback loop of LDO 150, the zero being located at the frequency [1/(2π(R765)(C120))]. When C120 is higher than the threshold noted above, the location of the zero is at a desired frequency. However, when C120 is less than the threshold, the lowering of the location of the zero is such as to render the main feedback loop potentially unstable (insufficient gain and/or phase margins). Therefore, when C120 is less than the threshold, the tap point is changed to node 761 (second junction node). Therefore, the location of the zero is changed to a frequency specified by [1/(2π(R760)(C120))], wherein R760 is the resistance of resistor 760 (third resistor). R760 is designed to have a larger value than R765. As a result, the zero location can be maintained at a desired frequency despite the reduction in C120.

In changing the tap point from node 776 to node 761, the tap point of Miller capacitor 783 is also changed to a higher-resistance tap (higher resistance due to R760 being greater than R765). At higher frequencies, the path through capacitor 780 dominates the path through resistors 765 and 230. As a result, the change in the tap point changes the zero frequency for the main feedback loop as well, and consequently variation in the zero frequency due to changes in the value of output capacitance is reduced. Thus, on detecting that the output capacitance is lower than the threshold, the effective ESR is increased (by turning switch 770 ON and switch 775 OFF) so that the increased value of resistance (R760 rather than R765) can compensate for the decreased output capacitance to some extent.

In another embodiment, in which the pole due to C120 is the dominant pole (i.e., pole due to C120 is at a lower frequency than any internal pole (including the pole due to RC circuit formed by resistor 715 and capacitor 720), if C120 is lower than the predetermined threshold noted above, the Miller capacitance is increased. Switch 781 (third switch) is closed, and the Miller capacitance is the sum of capacitances of capacitors 783 and 782. The value of the Miller capacitance is thereby increased. As a result, the pole due to C120 is 'pushed' further in (i.e., the location of the pole due to C120 is moved to a lower frequency than otherwise), and the location of internal poles are pushed to higher frequencies. As a result, the bandwidth of the main feedback loop is reduced, and stability is ensured. On the other hand, if C120 is higher than the threshold, switch 781 is opened, and the Miller capacitance is smaller (being the capacitance of capacitor 783 alone).

In yet another embodiment, in which an internal pole (e.g., the pole due to the RC network (first RC network) formed by resistor 715 and capacitor 720) is the dominant pole (i.e., internal pole is at a lower frequency than the pole due to C120), if C120 is lower than the threshold, switch 735 is closed. As a result, the frequency of the dominant (internal) pole is decreased due to the connection of the RC network (second RC network) formed by resistor 725 and capacitor 730. The decrease in the frequency of the internal pole reduces the bandwidth of the main feedback loop, thereby ensuring loop stability. If C120 is higher than the threshold, switch 735 is left open. Capacitance 730 is implemented to be greater than capacitance 720.

Figure 8A:
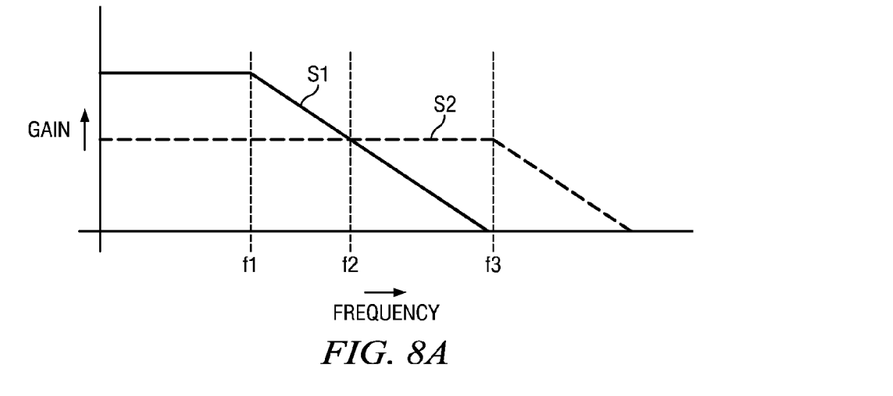
FIGS. 8A and 8B are diagrams showing gain-versus-frequency plots of parallely-connected amplifier chains in an LDO, in an embodiment.
Figure 8B:
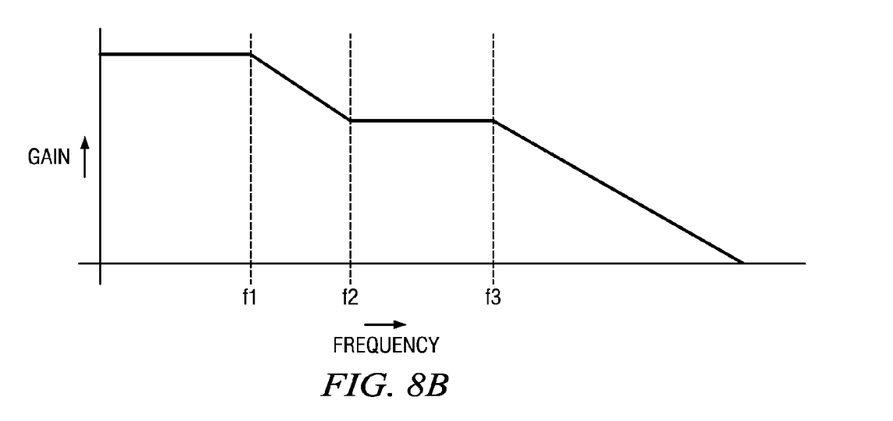

In some LDO architectures (i.e., in some embodiments of LDO 150), the pole (output pole) due to output capacitor 120 may be the dominant pole if the output capacitance is large, the output pole becoming a non-dominant pole if the output capacitance is small. In such architectures, when the output capacitance is small, one technique to cancel the non-dominant output pole is to generate a zero at the frequency of the output pole. Connecting two amplifiers in parallel, one with high gain and low bandwidth and the other with low gain and high bandwidth is one way of generating such a zero. Accordingly, in some of such embodiments, if C120 is lower than the threshold, each of switches 784 (fifth switch) and 786 (sixth switch) is closed, thereby connecting the cascaded amplifiers 710-1 through 710-N in parallel with the cascaded amplifiers 705-1 through 705-N. Specifically, the output of amplifier 710-N is connected to the input of gate driver stage 709, and resistor 785 (fourth resistor) is connected between the input of gate driver stage 709 and ground. The total gain provided by cascaded amplifiers 705-1 through 705-N (referred to conveniently as cascade-1) is designed to be high. By comparison, the total gain provided by cascaded amplifiers 710-1 through 710-N (referred to conveniently as cascade-2) is comparatively lower, but has a wider bandwidth than that provided by cascade-1. Plots S1 and S2 of FIG. 8A are example gain-versus-frequency plots of cascade-1 (first cascade of amplifiers) and cascade-2 (second cascade of amplifiers) respectively. Frequencies f1 and f3 are respective pole frequencies of cascade-1 and cascade-2. Frequency f2 is the intersection point of plots S1 and S2. FIG. 8A is a gain-versus-frequency plot of the sum of S1 and S2. It may be observed that the connection of cascade-2 in parallel with cascade-1 generates a zero at frequency f2.

Based on the specifics of the design of LDO 150 and expected range of possible values of output capacitance, the techniques noted above for modifying the compensation circuit can either be applied independently of each other, or two or more of the techniques can be applied in combination. Thus, circuits within LDO 150 measure output capacitance, or a parameter representative of the output capacitance, and modify the compensation circuit implemented within LDO 150 according to the measurement. Depending on which of the techniques for modifying the compensation circuit is/are implemented, the logic level of signal 541 (shown in FIG. 5) controls the state (whether open or closed) of the corresponding switch(s). Thus, for example, when the Miller capacitance is to be selected to either equal the capacitance of capacitor 783 alone or the sum of capacitances of capacitors 783 and 782, signal 541 controls the desired state (open/closed) of switch 781. The combination of logic 540 and the corresponding switch (or switches) 770, 775, 781, 735, 784 and 786 represents a "correction circuit" that operates to modify the compensation circuit, based on the output of the "measurement circuit" noted above.

4. Example System

Figure 9:
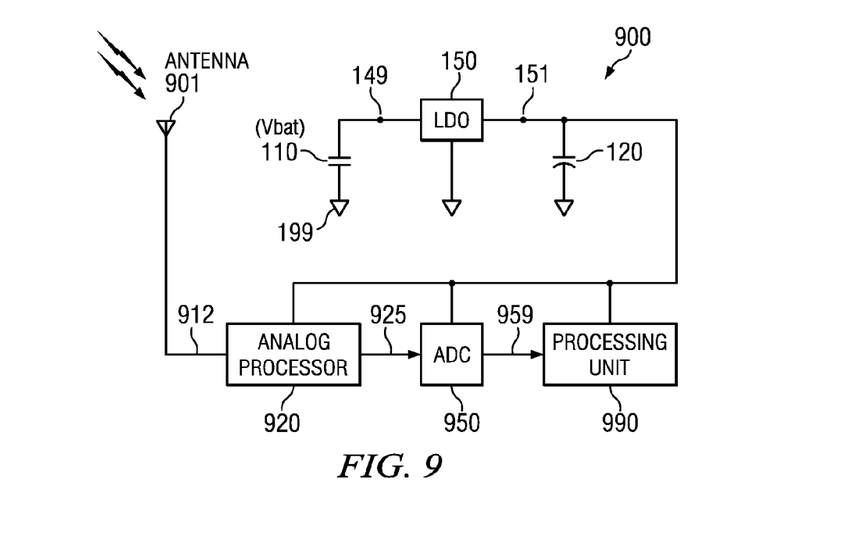
FIG. 9 is a block diagram of an example receiver system incorporating a voltage regulator, in an embodiment.

FIG. 9 is a block diagram of an example receiver system 900. Receiver system 900 may correspond to receivers such as a Global Positioning System (GPS) receiver, communication receivers such as an FM (frequency modulation) receiver, etc. Receiver system 900 is shown containing antenna 901, analog processor 920, ADC 950, processing unit 990 and voltage regulator 150, battery 110 and output capacitor 120.

Antenna 901 may receive various signals transmitted on a wireless medium. The received signals may be provided to analog processor 920 on path 912 for further processing. Analog processor 920 may perform tasks such as amplification (or attenuation as desired), filtering, frequency conversion, etc., on the received signals and provides the resulting processed signal on path 925.

ADC 950 converts the analog signal received on path 925 to corresponding digital values, which are provided on path 959 for further processing. ADC 950 may be implemented as a SD ADC according to techniques described in detail above. Processing unit 990 receives the data values on path 959, and processes the data values to provide various user applications. Voltage regulator 150 provides a regulated voltage (with battery 110 being the power source) for the operation of each of analog processor 920, ADC 950, and processing unit 990. Voltage regulator 150 operates to modify its internal compensation circuitry based on a measurement of capacitance 120, as described in detail above.

While in the illustrations of FIGS. 1, 2, 3, 4, 5, 6 and 7, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals. In the instant application, power supply and ground terminals are referred to as constant reference potentials.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A voltage regulator comprising:
a measurement circuit for generating a value representing a magnitude of a capacitance at an output node of the voltage regulator; and
a correction circuit for modifying, based on the value, a compensation circuit internal to the voltage regulator comprising resistance and capacitance and having a zero corresponding to a frequency substantially equal to (1/(2π(the resistance being total resistance of internal wiring of an integrated ciruit and the equivalent series resistance of the output capacitor)(the capacitance being capacitance of the output capacitor)) the correction circuit modifying a closed-loop feedback circuit by increasing a frequency of the zero in the closed feedback loop of the voltage regulator by changing values of the resistance or the capacitance in the feedback loop to provide stability to the closed feedback loop.

2. The voltage regulator of claim 1, further comprising a start-up circuit designed to generate, in a start-up interval, an output voltage with a constant ramp-rate at the output node,
wherein the measurement circuit generates a voltage proportional to a start-up current drawn via the voltage regulator in the start-up interval, wherein the measurement circuit compares the voltage with a reference voltage to generate the value.

3. The voltage regulator of claim 2, wherein the voltage divider network is comprised in the start-up circuit, the start-up circuit further comprising:
a series connection of a capacitor and a constant current source, the series connection coupled between the output node and the constant reference potential; and
a comparator, a first input of the comparator coupled to a junction of the first resistor and the second resistor, a second input of the comparator coupled to a junction of the capacitor and the current source,
wherein, in the start-up interval, the capacitor is charged to the reference voltage such that voltage across the junction of the capacitor and the current source and the output node equals +Vbg, wherein Vbg is the reference voltage,
wherein the capacitor is then allowed to discharge through the constant current source, whereby the output voltage in the start-up interval is generated to have the constant ramp-rate.

4. The voltage regulator of claim 1, wherein the voltage regulator is a low-dropout regulator (LDO).

5. A voltage regulator comprising:
a measurement circuit for generating a value representing a magnitude of an output capacitance connected at an output node of the voltage regulator; and
a correction circuit for modifying, based on the value, a compensation circuit internal to the voltage regulator wherein the value representing the magnitude of the output capacitance is a binary signal, a first logic level of the binary signal corresponding to a magnitude of the output capacitance less than a threshold, and a second logic level of the binary signal corresponding to the magnitude of the output capacitance greater than the threshold,
wherein the voltage regulator comprises a pass-transistor coupled in series with a voltage divider network containing a first resistor and second resistor, the voltage divider network being coupled in parallel with the output capacitor, wherein a path coupling the pass-transistor with the voltage divider network is associated with a first resistance,
wherein a tap point of the voltage divider network is coupled to a first amplifier coupled to the pass-transistor to form a feedback path of a main feedback loop of the voltage regulator, wherein the first amplifier is comprised in a first cascade of amplifiers, wherein an output of the first cascade of amplifiers is coupled to the pass-transistor, the first cascade of amplifiers to amplify a difference of a reference voltage and a voltage at the junction of the first resistor and the second resistor, and to generate a correction voltage at an output node of the first amplifier, wherein the output of the first cascade of amplifiers is generated as a difference of a voltage at the tap point and the reference voltage.

6. The voltage regulator of claim 5, wherein the compensation circuit comprises:
a Miller feedback loop, the Miller feedback loop comprising a first Miller capacitor, wherein a first terminal of the first Miller capacitor is coupled to a feedback terminal of the first amplifier in the first cascade of amplifiers; and
a mirror-transistor mirroring the pass transistor, the mirror-transistor coupled to the output node via a third resistor;
a first switch and a second switch,
wherein if the binary signal has the second logic level, the correction circuit opens the second switch and closes the first switch to connect the second terminal of the first Miller capacitor to a first junction node via which the fifth resistance is coupled to the pass-transistor,
wherein if the binary signal has the first logic level, the correction circuit opens the first switch and closes the second switch to connect the second terminal of the first Miller capacitor to a second junction node via which the third resistor is coupled to the mirror-transistor.

7. The voltage regulator of claim 6, wherein the compensation circuit further comprises a second Miller capacitor coupled in series with a third switch, the series connection of the second Miller capacitor and the third switch being coupled in parallel with the first Miller capacitance, wherein if the binary signal has the first logic level, the correction circuit closes the third switch to couple the second Miller capacitor and the first Miller capacitor in parallel, wherein if the binary signal has the second logic level, the correction circuit opens the third switch.

8. The voltage regulator of claim 6, wherein the compensation circuit further comprises:
a first series RC network comprising a resistor and a capacitor coupled in series, the first RC network being coupled between the output node of the first amplifier and a constant reference potential; and
a second series RC network comprising a resistor and a capacitor; and a fourth switch,
wherein if the binary signal has the first logic level, the correction circuit closes the fourth switch to couple the second series RC network in parallel with the first series RC network, wherein if the binary signal has the second logic level, the correction circuit opens the fourth switch.

9. The voltage regulator of claim 6, further comprising a second cascade of amplifiers to amplify the difference of the reference voltage and the voltage at the junction of the first resistor and the second resistor, wherein the compensation circuit further comprises:
a fifth switch;
a sixth switch; and
a fourth resistor, wherein the fifth switch, the sixth switch and the fourth resistor are coupled in series,
wherein if the binary signal has the first logic level, the correction circuit closes each of the fifth switch and the sixth switch to couple an output node of the second cascade of amplifiers to the output node of the first amplifier, and the fourth resistor between the output node of the first amplifier and the constant reference potential,
wherein if the binary signal has the second logic level, the correction circuit opens the fifth switch and the sixth switch.

10. A system comprising:
an antenna to receive a signal on a wireless medium;
an analog processor to process the signal and to generate a processed signal;
an analog to digital converter (ADC) to receive the processed signal as input and to generate a plurality of digital values representing the processed signal;
a processor to process the plurality of digital values; and
a voltage regulator to receive power from a battery, and provide a regulated output voltage for the operation of each of the analog processor, ADC, and the processor,
wherein, the voltage regulator comprises:
a measurement circuit for generating a value representing a magnitude of a capacitance at an output node of the voltage regulator; and
a correction circuit for modifying, based on the value, a compensation circuit internal to the voltage regulator comprising resistance and capacitance and having a zero corresponding to a frequency substantially equal to (1/(2π(the resistance being total resistance of internal wiring of an integrated circuit and the equivalent series resistance of the output capacitor)(the capacitance being capacitance of the output capacitor)) the correction circuit modifying a closed-loop feedback circuit by increasing a frequency of the zero in the closed feedback loop of the voltage regulator by changing values of the resistance or the capacitance in the feedback loop to provide stability to the closed feedback loop.

11. The system of claim 10, wherein the voltage regulator is a low-dropout regulator (LDO).

12. A system comprising:
an antenna to receive a signal on a wireless medium;
an analog processor to process the signal and to generate a processed signal;
an analog to digital converter (ADC) to receive the processed signal as input and to generate a plurality of digital values representing the processed signal;
a processor to process the plurality of digital values; and
a voltage regulator to receive power from a battery, and provide a regulated output voltage for the operation of each of the analog processor, ADC, and the processor,
wherein, the voltage regulator comprises:
a measurement circuit for generating a value representing a magnitude of capacitance at an output node of the voltage regulator; and
a correction circuit for modifying, based on the value, a compensation circuit internal to the voltage regulator wherein the value representing the magnitude of the capacitance at the output node is a binary signal, a first logic level of the binary signal corresponding to a magnitude of the output capacitance less than a threshold, and a second logic level of the binary signal corresponding to the magnitude of the output capacitance greater than the threshold,
wherein the voltage regulator comprises a pass-transistor coupled in series with a voltage divider network containing a first resistor and second resistor, the voltage divider network being coupled in parallel with the output capacitor, wherein a path coupling the pass-transistor with the voltage divider network is associated with a first resistance,
wherein a tap point of the voltage divider network is coupled to a first amplifier coupled to the pass-transistor to form a feedback path of a main feedback loop of the voltage regulator, wherein the first amplifier is comprised in a first cascade of amplifiers, wherein an output of the first cascade of amplifiers is coupled to the pass-transistor, the first cascade of amplifiers to amplify a difference of a reference voltage and a voltage at the junction of the first resistor and the second resistor, and to generate a correction voltage at an output node of the first amplifier, wherein the output of the first cascade of amplifiers is generated as a difference of a voltage at the tap point and the reference voltage.

13. The system of claim 12, wherein the voltage regulator further comprises a start-up circuit designed to generate, in a start-up interval, an output voltage with a constant ramp-rate at the output node,
wherein the measurement circuit generates a voltage proportional to a start-up current drawn via the voltage regulator in the start-up interval, wherein the measurement circuit compares the voltage with a reference voltage to generate the value.

14. The system of claim 13, wherein the compensation circuit comprises:
a Miller feedback loop, the Miller feedback loop comprising a first Miller capacitor, wherein a first terminal of the first Miller capacitor is coupled to a feedback terminal of the first amplifier in the first cascade of amplifiers; and
a mirror-transistor mirroring the pass transistor, the mirror-transistor coupled to the output node via a third resistor;
a first switch and a second switch, wherein if the binary signal has the second logic level, the correction circuit opens the second switch and closes the first switch to connect the second terminal of the first Miller capacitor to a first junction node via which the fifth resistance is coupled to the pass-transistor, wherein if the binary signal has the first logic level, the correction circuit opens the first switch and closes the second switch to connect the second terminal of the first Miller capacitor to a second junction node via which the third resistor is coupled to the mirror-transistor.

15. The system of claim 14, wherein the compensation circuit further comprises a second Miller capacitor coupled in series with a third switch, the series connection of the second Miller capacitor and the third switch being coupled in parallel with the first Miller capacitance, wherein if the binary signal has the first logic level, the correction circuit closes the third switch to couple the second Miller capacitor and the first Miller capacitor in parallel, wherein if the binary signal has the second logic level, the correction circuit opens the third switch.

16. The system of claim 15, wherein the compensation circuit further comprises:
a first series RC network comprising a resistor and a capacitor coupled in series, the first RC network being coupled between the output node of the first amplifier and a constant reference potential; and
a second series RC network comprising a resistor and a capacitor; and a fourth switch,
wherein if the binary signal has the first logic level, the correction circuit closes the fourth switch to couple the second series RC network in parallel with the first series RC network, wherein if the binary signal has the second logic level, the correction circuit opens the fourth switch.

17. The system of claim 16, further comprising a second cascade of amplifiers to amplify the difference of the reference voltage and the voltage at the junction of the first resistor and the second resistor, wherein the compensation circuit further comprises:
a fifth switch;
a sixth switch; and
a fourth resistor, wherein the fifth switch, the sixth switch and the fourth resistor are coupled in series,
wherein if the binary signal has the first logic level, the correction circuit closes each of the fifth switch and the sixth switch to couple an output node of the second cascade of amplifiers to the output node of the first amplifier, and the fourth resistor between the output node of the first amplifier and the constant reference potential,
wherein if the binary signal has the second logic level, the correction circuit opens the fifth switch and the sixth switch.

* * * * *